Sept. 29, 1936.  F. T. FAWCETT  2,055,895
POWER TRANSMISSION
Filed Oct. 30, 1933  4 Sheets-Sheet 4

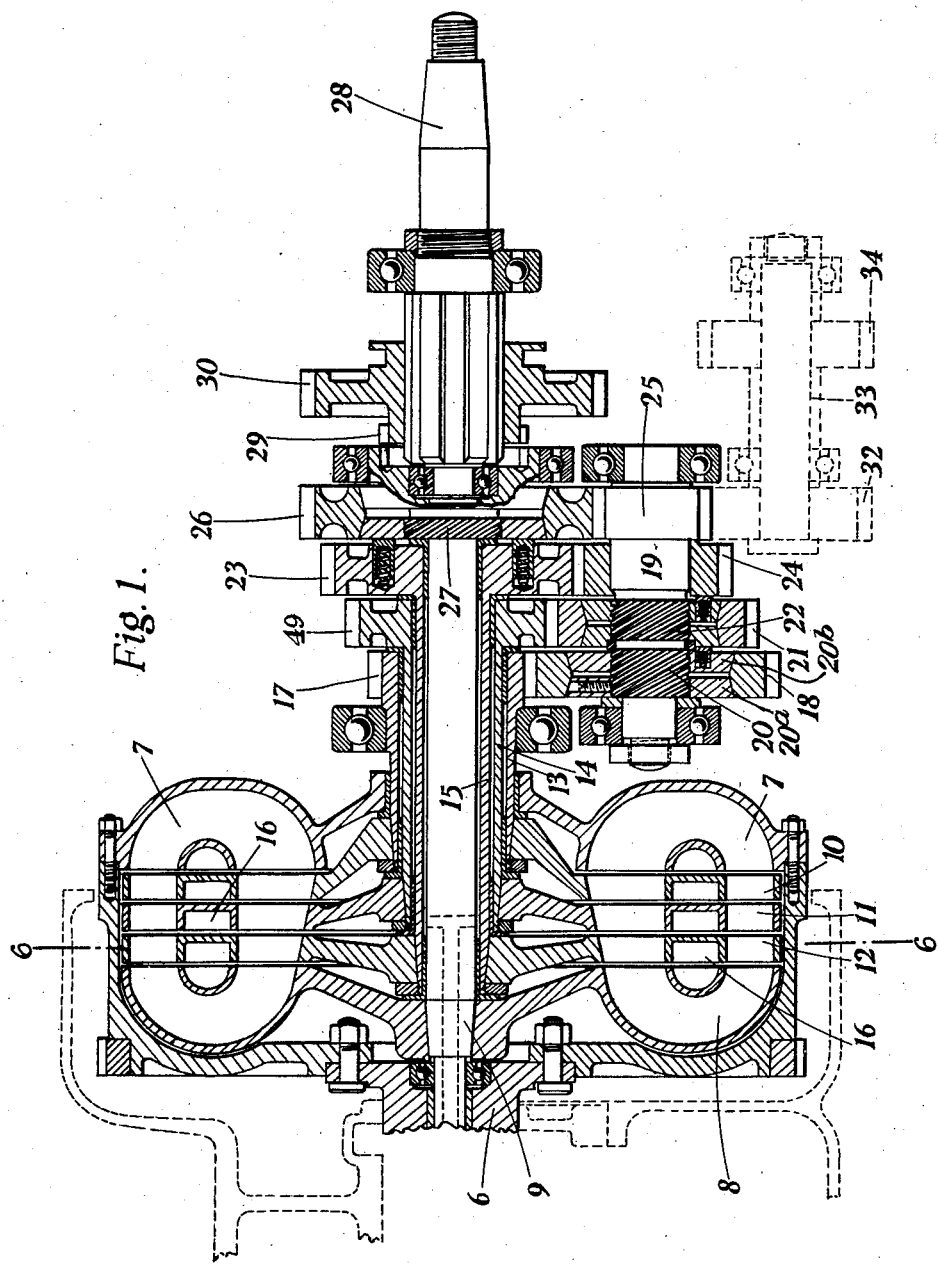

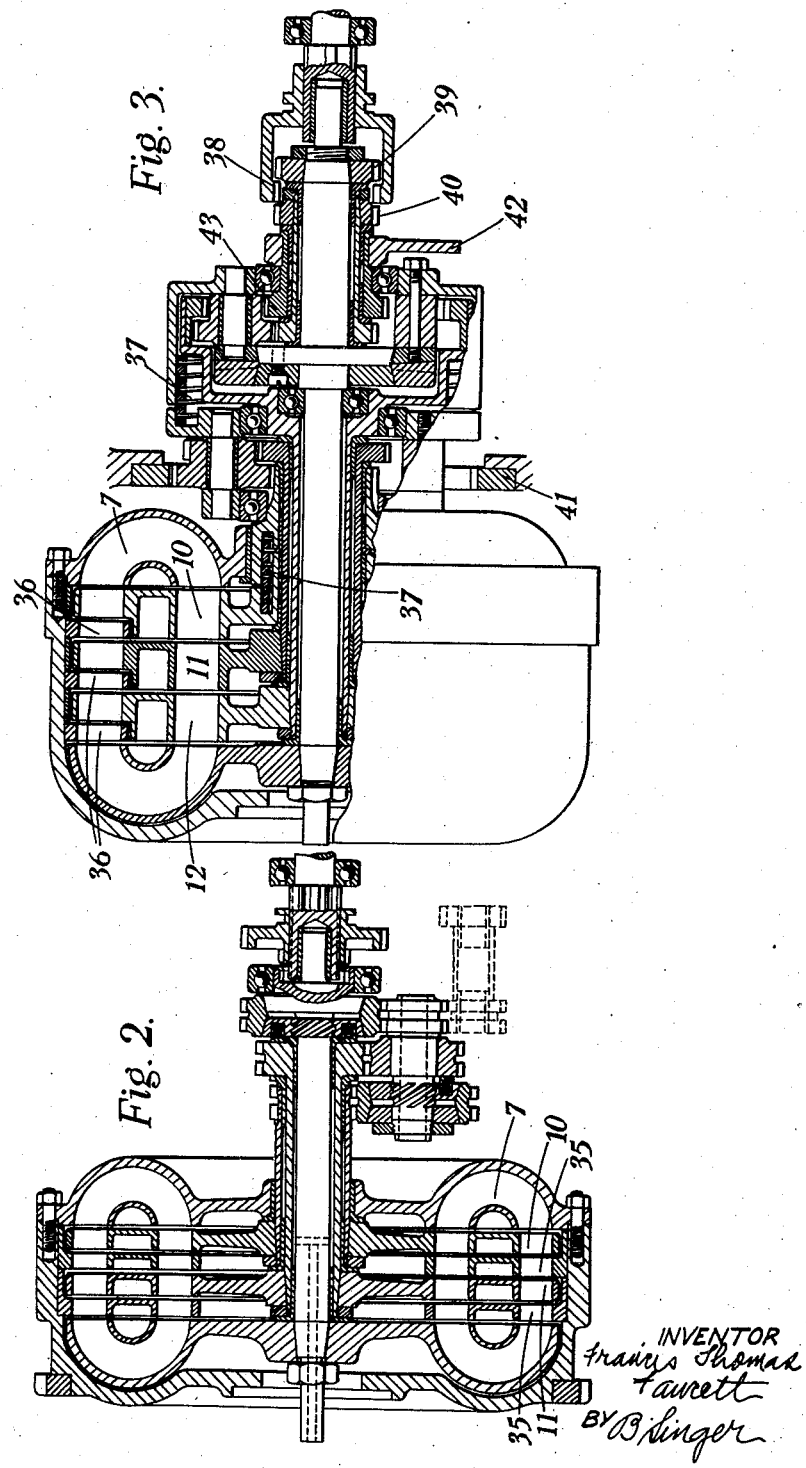

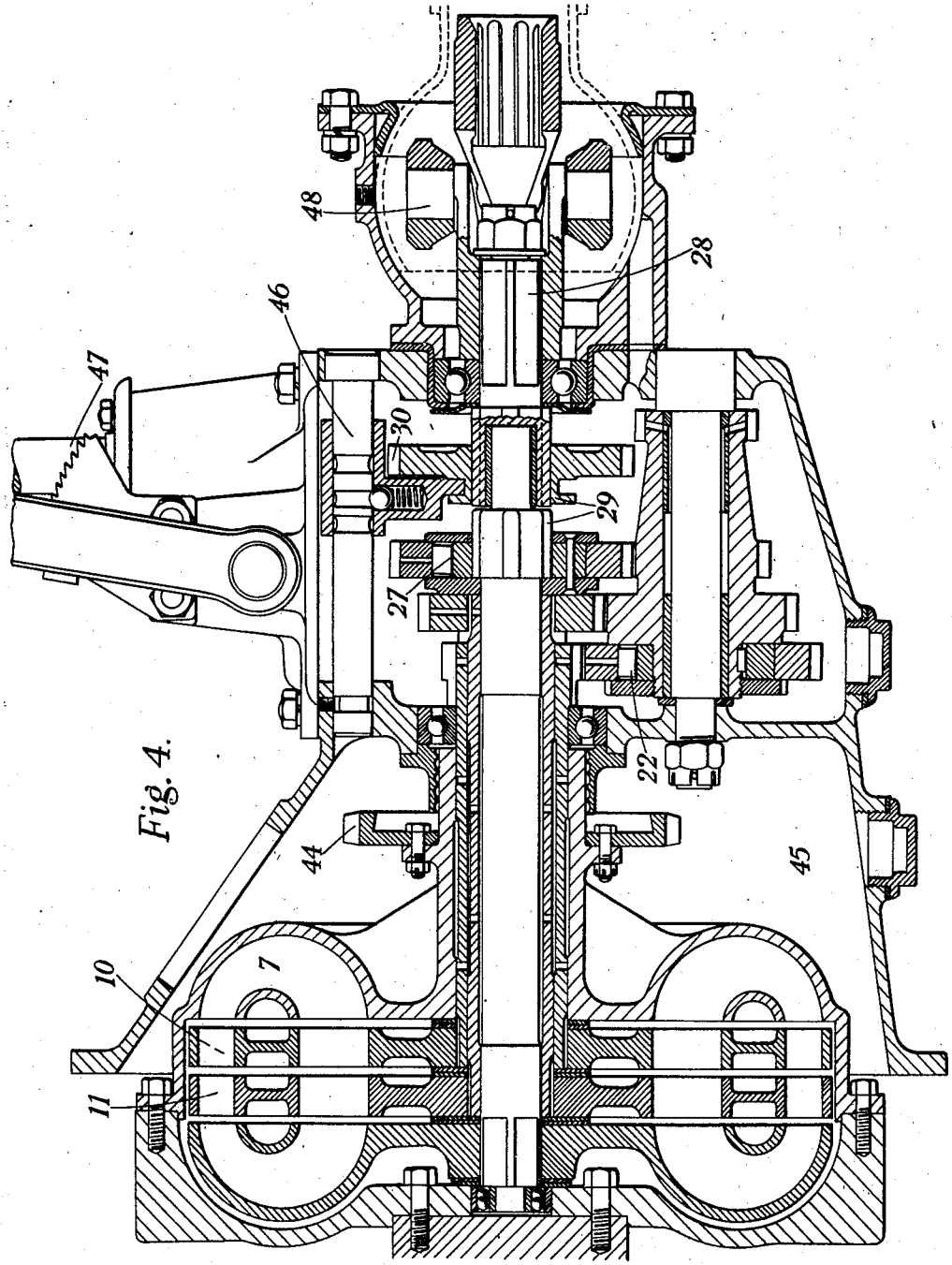

INVENTOR
Francis Thomas Fawcett
BY B. Singer
ATTORNEY

Patented Sept. 29, 1936

2,055,895

UNITED STATES PATENT OFFICE 2,055,895

POWER TRANSMISSION

Francis Thomas Fawcett, Woodford Green, England

Application October 30, 1933, Serial No. 695,898
In Great Britain November 9, 1932

10 Claims. (Cl. 74—330)

This invention relates to an automatically variable speed gear employing a hydraulic clutch of the Föttinger or like type and it has for its object to provide an improved speed gear wherein the transmission ratio is automatically made suitable for the conditions of operation encountered.

An automatically variable speed gear according to the invention utilizes a hydraulic clutch of the Föttinger or like type, having a driving element to which a power input is applied and a plurality of driven elements through which fluid is impelled successively from one to the other and this clutch is combined with gears so arranged that each driven element is connected to the output shaft with a different ratio, the drive being taken up successively by the different driven elements of the hydraulic clutch.

The hydraulic clutch employed preferably utilizes an enclosing casing in which the driven elements are rotatably arranged, passages being formed in said casing and in said elements through which the oil or other operating fluid circulates. The circulation of the fluid is thus effected through the different driven elements successively and rotational torque is applied by such fluid to said elements. When the output shaft is stationary, most torque is applied to the first driven element (i. e. that nearest the driving element) of the clutch since this element is stationary and after traversing the said first element the major part of the kinetic energy of the fluid will be lost.

Assuming, however, that the output shaft is being accelerated, said first element is speeded up until its speed approximates that of the driving element whereupon the kinetic energy of the fluid reaching the succeeding driven element is increased so that the drive is gradually taken up through said second driven element when the first driven element attains the same speed as the driving element. In the same way the third element takes over the drive when the second element has been accelerated, and so on. The drive is thus taken up successively through the different driven elements of the clutch until the driving torque is applied to the element most remote from the driving element, and which is conveniently connected to the output shaft directly.

In order to enable the driven elements to continue to run at the same speed as the driving element while the following element or elements is/are being accelerated, free-wheel or one-way clutch mechanism is provided in conjunction with part at least of the gears connecting said driven elements to the output shaft.

The driven element nearest the driving element is connected to the output shaft by gears having the highest ratio while the succeeding driven elements have progressively lower ratios, the final element being, as stated, preferably connected directly to the output shaft.

The driven elements are preferably graduated in diameter, that nearest the driving element having the greatest active diameter, and the others, progressively smaller diameters.

For the mechanical connection of the driven elements of the hydraulic clutch to the said gears, concentric hollow shafts or sleeves are preferably adopted and associated driving gear wheels can be formed on or attached to the outer ends of said shafts or sleeves. The final element may be fixed to a solid shaft arranged within the concentric sleeves and if desired the shaft may be formed with a passage and openings for distributing lubricating oil.

The whole transmission means if required may be mounted in an outer casing comprising a sump for assisting in the circulation of the oil.

Although transmission means according to the invention can be used for a great variety of purposes, they are particularly advantageous for use for motor road vehicles, locomotives and other similar uses.

In one particular transmission means according to the invention for motor road vehicles, the fluid clutch has three driven members and one driving member, which also serves as the flywheel of the engine. The three driven members are coupled to a first, second and top gear respectively, the first speed clutch member coming nearest to the engine driving portion, the second being placed next and so on, the top gear being the last. Consequently, as the engine is accelerated the rotating fluid from the member of the fluid clutch connected to the engine will first act upon the first gear member until this member reaches a speed approaching the engine revolutions.

During this period the second gear portion of the fluid clutch rotates more slowly than the first gear portion by a definite ratio depending on the sizes of the gear wheels. However, after the first gear portion has been accelerated to engine speed, this portion continues to run at engine speed while the second gear portion of the fluid clutch takes up the drive, free-wheel mechanism permitting the first gear portion to run at engine speed and not at that definite ratio to the second gear portion to which reference was made above. Upon the second gear portion reaching the engine speed, the same process is repeated for the various successive positions and so on until direct drive is the result.

It should be particularly observed that the change from one gear speed to another is gradual and automatic, that is to say at certain points during the acceleration of the engine, the power will be passing through more than one gear at the same time until direct drive is obtained, thus eliminating all shocks and lost time.

Upon deceleration, such as when climbing a hill, the reverse process takes place, i. e. when a greater resistance is encountered, due to the incline of the hill, slipping commences to take place on the top gear fluid clutch. The drive then commences to be taken through the next lowest gear portion of the fluid clutch, since a smaller amount of engine torque will serve to drive the vehicle through this gear portion. If necessary the succeeding lower gear portions of the fluid clutch are engaged according to the requirements of the vehicle.

It should be noted that with transmission means according to the invention when the load is small, the gear is automatically maintained in the lowest ratio but directly the load is increased or the throttle opened, the gear ratio is immediately and automatically increased, thereby giving improved acceleration, for example in the case of a car, when passing slower vehicles and after rounding sharp bends or recovering from traffic blocks. Further, there is no possibility of the driver permitting the engine to labour at too slow speed nor any possibility of excessive racing of the engine on low gears.

In order that the invention may be more fully understood, the same will now be described by way of illustration and not limitation with reference to the accompanying drawings, wherein:—

Fig. 1 is a diagrammatic sectional view of one form of the invention giving four speed ratios.

Figs. 2 and 3 are diagrammatic sections showing other embodiments of the invention.

Fig. 4 is an enlarged sectional view of one form of the invention wherein the mechanism is mounted in a casing and is applicable particularly for an automobile transmission.

Figure 5:
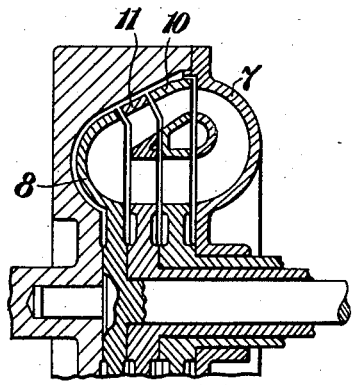
Fig. 5 illustrates in section a modification wherein the parts of the clutch are of graduated size.
Figure 6:
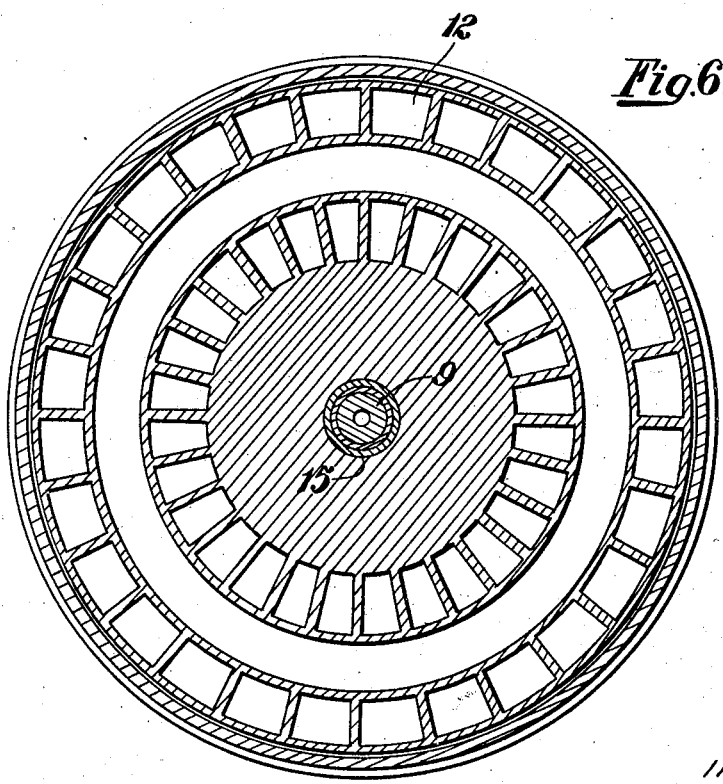
Fig. 6 is a cross sectional view of the mechanism on the line 6—6 of Fig. 1.

In Fig. 1, 6 is the end of the engine shaft which carries the casing and driving member 7 of the fluid clutch. The final driven member 8 of the fluid clutch is mounted upon a shaft 9 spigoted into the end of the driving shaft 6 and having a passageway therethrough for lubricating oil, said passageway terminating in distributing passages.

It will be observed that the final driven member 8 of the fluid clutch is located in the housing thereof and in addition three intermediate driven members are mounted between the driving portion 7 and the driven portion 8. These driven members 10, 11 and 12 are carried by sleeves 13, 14 and 15 respectively, which sleeves come around the shaft 9.

It should be noted that the driving member 7, the intermediate members 10, 11, 12 and the final driven member 8 include annular members numbered as a group 16 to cause and permit the somewhat helical movement of the liquid about a theoretical circumference when member 7 rotates relatively to the driven members 11, 12 or 8.

There is thus formed around the periphery of the fluid clutch, a series of annular passages through which the fluid (i. e. liquid) is projected by the rotation of driving element 7. Radially extending vanes (not shown in section) extend across said passages and serve to apply the desired motion to the liquid under the action of the centrifugal force produced on rotation of the driving element 7.

The free end of the sleeves 13 carries a gear wheel 17 meshing with a gear wheel 18 carried by a lay shaft 19 with the interposition of the freewheel mechanism 20 of any known type. Said free wheel mechanism includes a pair of relatively movable plate members 20ᵃ and 20ᵇ arranged on a threaded part of shaft 19. The former plate is rigidly fixed to said threaded part by means of grub screws for example, while the plate 20ᵇ is adapted to rotate on said threaded part and thereby be subjected to movement to the left or right according to the direction of rotation. The peripheral surfaces of the members 20ᵃ and 20ᵇ are coned as indicated to engage correspondingly coned surfaces on the inner surface of an externally toothed ring constituting the gear wheel 18. It will readily be seen that anti-clockwise rotation of wheel 18, when viewing Fig. 1 from the left toward the right, will cause plate member 20ᵇ to screw on the thread so as to move towards the plate member 20ᵃ and thereby form a driving connection between 18 and the supporting shaft. The spring pressed cup 20ᶜ in the plate member 20ᵇ normally urges the plate members 20ᵃ and 20ᵇ toward one another, so that the desired driving connection between the wheel 18 and the shaft 20 is effected instantaneously. When, however, gear wheel 21 tends to take over the drive, the supporting shaft tends to over-run wheel 18 and plate 20ᵇ moves to the right to free the wheel 18 and allow the supporting shaft to run faster than wheel 18.

Similarly, the sleeve 14 carries a gear wheel 49 of larger pitch diameter than the wheel 17 meshing with a gear wheel 21 mounted on the lay shaft 19 with the interposition of a freewheel mechanism 22 similar to 20, already described, the pitch diameter of the wheel 21 being smaller than that of the gear 18.

The sleeve 15 also carries the gear wheel 23 larger than the gear wheel 49 and meshing with a gear 24 smaller than the gear 21 and fixed to lay shaft 19.

The connection of the gear 24 to the lay shaft 19 does not include a freewheel mechanism but to the lay shaft is fixed a final gear wheel 25 meshing with a gear wheel 26 larger than the gear wheel 23 and carried by the end of the shaft 9 through a freewheel mechanism 27.

Spigoted into the end of the shaft 9 is the driven shaft 28 which has slidably mounted thereon in such a manner that it is caused to turn therewith, one-half of a dog clutch member 29, the co-operating portion of which is carried by the shaft 9. The clutch member 29 also has a gear wheel 30 integral therewith and is adapted to be moved on the shaft 28 through suitable striking gear.

The lower part of the figure has diagrammatically represented thereon a reversing gear comprising a toothed wheel 32 on a shaft 33 and permanently in mesh with layshaft gear 25. Shaft 33 also carries another toothed wheel 34. This representation of the reversing mechanism is shown angularly displaced from its normal position for the sake of clearness but the wheel 34 can be engaged by the wheel 30 when the latter is slid on the shaft 28. By this means a reverse drive of the shaft 28 is effected.

It should be understood that the clutch 29 can be disengaged as shown on the drawings, constituting a standstill or neutral position, or can be engaged with the cooperating part, in which case the shaft 28 turns with the shaft 9, or can be disengaged and slid so that the gear wheel 30 meshes with the gear wheel 34, thus causing the reverse drive to the shaft 28.

Another somewhat similar form of transmission means to that shown in Fig. 1 is shown in Fig. 2. In this figure, the only substantial difference is that two intermediate stages 10 and 11 only are shown and in addition the driving member 7 of the fluid clutch has turning therewith disc-like vaned members 35 for speeding up the liquid between the stages. The said vaned members, being connected to the clutch casing, are positively driven by the engine to obtain the required speeding up action. Also in this figure the ordinary toothed gears are replaced by double helical gears.

Again, in Fig. 3, the construction is somewhat similar to that shown in Figs. 1 and 2, but in this case three intermediate stages 10, 11 and 12 are shown and speeding-up members 36 extending only about half the radial distance of the vanes are utilized and turn with the driving member 7. The freewheel devices are varied and as shown are comprised by one-way spring clutches 37 and in place of the gears being located on a separate lay shaft, an epicyclic arrangement is adopted, a dog clutch member 38 being adapted to be set in the neutral position as shown or in a forward or reverse position 39 or 40 respectively. In this figure, 41 is a fixed annulus and 42 a bracket supporting a fixed sun pinion 43. The rest of the construction will be obvious as it is simply a modification of the transmission means already described, the modifications being necessitated by the epicyclic arrangement.

Fig. 4 shows a somewhat similar form of the invention to that shown in Fig. 1, but with only two intermediate stages 10 and 11.

The driving member 7 has associated therewith the sprocket 44 for a self-starter and the bearings for the various shafts are mounted in a casing or sump 45. This casing also has associated therewith a three-position striking gear 46 controlled by the usual lever 47 enabling the parts to be put in the neutral, forward or reverse position. The neutral position is shown in the drawings and the forward is given by the engagement of the dog-clutch parts 29, the reverse being effected, by an additional shaft not shown but similar to 32 (Fig. 1), having suitable gears thereon, through the co-operation of the gear wheel 30. In addition a Cardan joint 48 is shown associated with the shaft 28. The free wheel mechanisms 22 and 27 also will be observed.

The method of operation will be particularly described with reference to Fig. 4 hereinafter, but it will be understood that the mechanism described with reference to the other figures operates in a similar manner. Assuming in the first place that the output shaft is stationary while the input or engine shaft is positively driven by the engine, this drives the clutch member 7, causing circulation of liquid around the annular space at the clutch periphery. The circulating liquid applies torque to clutch member 10 while the latter is stationary but when it commences to rotate a certain portion of the torque is applied to the other clutch members 11 and 8. If now the engine is accelerated, sufficient torque may be applied to clutch member 10 to cause rotation of the output shaft against the load, it being understood that this member 10 is connected through the lay shaft gears with a comparatively high ratio. Consequently member 10 is gradually accelerated unitl the speed thereof approaches that of member 7. During this period members 11 and 8 are rotated at a slower rate than member 10 by means of the lay shaft gears. When member 10 is rotating at the same speed as member 7, member 11 is accordingly rotating at a lower speed and is in a position to take over the drive if the load is not too great. Member 11 is therefore gradually accelerated up to engine speed and during this period member 10 continues to rotate at the same speed by virtue of the free wheel 22 incorporated in the lay shaft gear driven by said members. After member 11 has reached engine speed, the drive is taken up by member 8 and direct drive is obtained between engine shaft and output shaft, members 10 and 11 rotating together at the same speed, since the free wheels 22 and 27 permit this to take place. Change of transmission ratio from one speed to another is thus obtained automatically according to requirements. The operation is probably somewhat more complicated than that described above since when the speed of clutch member 10 is still somewhat less than 7 it is probable that some proportion of the torque is transmitted through member 11, ensuring a gradual transformation from one ratio to the next when the speed of 10 is equalized with that of 7.

The mechanism shown in Fig. 4 has operated satisfactorily in practice, being built to the dimensions of and replacing the normal clutch and gear box of a mass produced car.

Fluid clutches as utilized in transmission means according to the present invention preferably are formed with filling openings whereby they can be readily charged, and if desired the fluid such as oil operating the said clutches can be included in and replenished by any suitable lubricating system.

As shown in Fig. 5, the active diameters of the driven elements of the clutch, 10, 11 and 8, may be of progressively graduated diameter, that (10) nearest the driving element 7 and connected to the output shaft by gearing having the greatest ratio, having the greatest diameter.

Although in most forms it is preferred to enclose all the stages of a fluid clutch according to the invention in one housing so that the whole forms a multi-stage fluid clutch, yet in certain cases, especially for large installations, more than one separate fluid clutch may be utilized, the said separate fluid clutches constituting the various stages and/or themselves each having intermediate stages and being connected to the load in an analogous manner to that already set forth.

The invention is not limited to the precise forms or details of construction described, as these may be varied to suit particular cases.

What I claim and desire to secure by Letters Patent of the United States of America is:—

1. An automatically variable speed gear connecting driving and driven shafts comprising a fluid clutch having a driving element connected to the driving shaft and a plurality of driven elements, fluid passages being formed in said driving and driven elements common to all of said elements, concentric sleeves connected to some of said driven elements, gear wheels on the ends of said concentric sleeves remote from said driven elements, a rotatable lay shaft, toothed members on said lay shaft meshing with the gear wheels on said concentric sleeves, a spindle passing through said concentric sleeves and connected to another driven clutch element, a gear wheel on said spindle, free-wheel mechanism between said gear wheel and said spindle, a toothed member on said lay shaft meshing with said last mentioned gear wheel, a further gear wheel slidably mounted on the driven shaft, striking means for sliding said further gear wheel, a reverse gear train between a further gearing element on said lay shaft and said further gear wheel and engageable by the latter in one position thereof, and means whereby said further gear wheel in its other extreme position connects said spindle to said driven shaft.

2. An automatically variable speed gear connecting driving and driven shafts comprising a fluid clutch having a driving element connected to the driving shaft and a plurality of rotatable driven elements, annular passages being formed in said driving and driven elements around the periphery thereof, a sleeve connected to the driven element nearest the driving element, a gear wheel on the remote end of said sleeve, another sleeve concentric with the first sleeve connected to the second driven element, a second gear wheel of larger diameter than the first gear wheel on the remote end of said second sleeve, a spindle connected to the driven element furthest from said driving element, a third gear wheel on the remote end of said spindle, free-wheel mechanism between the peripheral toothed part of said gear wheel and the part thereof connected to said spindle, a dog clutch element formed on the end of said spindle, said spindle being axially aligned with the driven shaft, a gear wheel slidably mounted on the end of the driven shaft, striking mechanism for moving said gear wheel into such position that it forms a driving connection between said spindle and said driven shaft, a rotatable lay shaft, three toothed members on said lay shaft adapted to mesh with the gear wheels on said sleeves and on said spindle, free-wheel mechanism between the toothed periphery of one of said lay shaft gears and the lay shaft, a further gear wheel on said lay shaft, and a reverse gear train meshing with said further gear wheel, one wheel of said reverse train being adapted to be engaged by the slidable gear wheel on the driven shaft when said gear wheel is moved into such position that it does not connect the said spindle and the driven shaft.

3. An automatically variable speed gear connecting driving and driven shafts comprising a fluid clutch forming a flywheel and embodying a driving element and a plurality of driven elements, annular passages being formed in said driving and driven elements around the periphery of said clutch, through which passages the liquid is successively projected by the centrifugal force set up in said passages and thereby turning moment is applied to the plurality of driven elements forming part of the said clutch, concentric means connecting said driven elements to a plurality of gear wheels of different sizes, a lay shaft, gears on said lay shaft meshing with the gears connected to the driven elements of the clutch, connecting means between said lay shaft and the driven shaft, means whereby said driven clutch members may be moved freely in one direction relatively to the others, and means connecting one of said driven elements to the driven shaft.

4. An automatically variable speed gear connecting driving and driven shafts comprising a fluid clutch embodying a rotatable housing containing a plurality of driven clutch elements, annular passages being formed partly in said driven elements and partly in said housing whereby liquid contained in said housing is projected through the parts of the passages in the driven elements to apply turning movement to the latter, concentric means connecting said driven elements to a plurality of gear wheels of different sizes, a lay shaft having gears thereon adapted to mesh with the aforesaid gear wheels, connecting means between said layshaft and the driven shaft, means whereby each of said driven elements can rotate relatively to the others in one direction and means connecting one of said driven elements directly to the driven shaft.

5. An automatically variable speed gear as claimed in claim 4, wherein said clutch casing embodies means for accelerating the flow of liquid through said annular passage, said means comprising inwardly extending disc-like members located between the adjacent clutch elements and serving to accelerate the fluid in said annular passages.

6. An automatically variable speed gear as claimed in claim 4, wherein radial vanes are provided in said annular passages.

7. An automatically variable speed gear connecting driving and driven shafts comprising a fluid clutch having a first terminal element provided with a curved liquid passage, a plurality of disc-like elements arranged face to face and adjacent said terminal element, said intermediate elements being provided with straight liquid passages, and a second terminal element provided with curved liquid passages corresponding in position to the liquid passages in the intermediate elements, toothed gears having a different ratio between the various intermediate elements and the driven shaft, means connecting the second terminal element directly to the driven shaft, and free-wheel mechanism permitting said intermediate elements or said second terminal element to turn freely in one direction relatively to the others.

8. An automatically variable speed gear connecting driving and driven shafts comprising a hydraulic clutch embodying a casing provided with a series of curved passages, a plurality of disc-like intermediate elements arranged one after the other adjacent the curved passages, a terminal element provided with a curved passage opening adjacent the passages in the disc-like intermediate elements, toothed gears between the intermediate actuated elements and the driven shaft, the element nearest the curved passages in the casing having the highest ratio and the others having progressively lower ratios, a direct connection between the terminal actuated element most remote from the casing and the driven shaft, and means to permit any of said intermediate elements or said terminal element to rotate independently of the others in one direction.

9. An automatically variable speed gear connecting driving and driven shafts, comprising a fluid clutch having a first terminal element provided with curved liquid passages, a plurality of disc-like intermediate elements arranged face to face and adjacent said terminal element, said intermediate elements being of progressively reduced diameters and being provided with straight liquid passages, a second terminal element provided with curved liquid passages corresponding in position to the passages extending through said intermediate elements, gear wheels having a different ratio between the various intermediate elements and the driven shaft, means connecting the second terminal element directly to the driven shaft, and free-wheel mechanism permitting said intermediate elements or said second terminal element to turn freely in one direction relatively to the others.

10. An automatically variable speed gear connecting driving and driven shafts, comprising a fluid clutch having a first terminal element provided with curved liquid passages, a plurality of disc-like intermediate elements arranged face to face and adjacent said terminal element, said intermediate elements having progressively reduced diameters, that of largest diameter being adjacent said terminal element and said intermediate elements being provided with straight liquid passages coincident with the passages in the said terminal element, a second terminal element provided with curved liquid passages corresponding in position to the liquid passages in the intermediate elements, gear means connecting the intermediate elements to the driven shaft, that element of largest diameter and positioned nearest the first terminal element having the greatest gear ratio while the others have progressively smaller ratio means connecting the second terminal element directly to the driven shaft and free-wheel mechanism permitting said intermediate elements or said second terminal element to turn freely in one direction relatively to the others.

FRANCIS THOMAS FAWCETT.